US008824997B2

(12) United States Patent
Gehlen et al.

(10) Patent No.: US 8,824,997 B2

(45) Date of Patent: Sep. 2, 2014

(54) CELLULAR NETWORK BASED ASSISTANT FOR VEHICLES

(75) Inventors: Guido Gehlen, Neuss (DE); Gordian Jodlauk, Würselen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 64 days.

(21) Appl. No.: 13/583,416

(22) PCT Filed: Mar. 12, 2010

(86) PCT No.: PCT/EP2010/053175

§ 371 (c)(1), (2), (4) Date: Nov. 6, 2012

(87) PCT Pub. No.: WO2011/110227

PCT Pub. Date: Sep. 15, 2011

(65) Prior Publication Data

US 2013/0059558 A1 Mar. 7, 2013

(51) Int. Cl.

*H04W 4/22* (2009.01)

(52) U.S. Cl.

USPC .................................... 455/404.1; 455/456.1

(58) Field of Classification Search

USPC .......... 455/404.1, 404.2, 456.1; 370/315, 400

See application file for complete search history.

(56) References Cited

U.S. PATENT DOCUMENTS

| | | | |
|---|---|---|---|
| 6,529,831 | B1 | 3/2003 | Smith |
| 2004/0181340 | A1 | 9/2004 | Smith |
| 2009/0174572 | A1 | 7/2009 | Smith |

*Primary Examiner* — Sam Bhattacharya

(74) *Attorney, Agent, or Firm* — Coats & Bennett, P.L.L.C.

(57) ABSTRACT

A driver assistant system which is based on a cellular telecommunications network comprises detecting a spatial zone in the cellular telecommunications network; receiving route indication information from a mobile terminal on a vehicle inside the spatial zone with a network entity of the cellular telecommunications network; generating a trajectory for the vehicle based on the received route indication information; calculating a danger situation probability for the vehicle based on the generated trajectory; and sending a notification message to the mobile terminal if the danger situation probability exceeds a predefined threshold probability.

20 Claims, 6 Drawing Sheets

CELLULAR NETWORK BASED ASSISTANT FOR VEHICLES

TECHNICAL FIELD

The present invention relates to a network entity of a cellular telecommunications network, a mobile terminal for use in a cellular telecommunications network, methods of operating such, and to respective computer programs and computer program products. In general, the present invention relates to a driver assistant system for vehicles which is based on a cellular telecommunications network.

BACKGROUND

In recent years vehicles have become more and more equipped with electronic systems and devices which aim to assist drivers. In these systems enhancing driving comfort is not the only motivation, however, since they are also able to substantially contribute to driving safety. Such electronic systems include, for example, cellular communication devices (mobile phones), navigation systems (including satellite-based positioning systems), and the like, and have already become integrated with traffic alert or road condition warning systems, such to provide the driver with warnings or indications toward deviations in case of traffic jams, road blocks, bad weather conditions, or other related factors.

Besides these integrated systems that rely at least to some extent on services that provide respective warning information (i.e. services who actually determine whether specific road or traffic conditions render necessary the generation and the broadcast of respective warnings), there also exist warning systems that are more or less completely independent from any service providers. These systems include so-called intersection assistants that are based on an ad-hoc communication amongst the involved vehicles, i.e. local radio signal transmission and reception, and which provide some assistance in several driving situations. These system recently also include radar-based systems that determine speed and distance of surrounding vehicles in order to be able to detect, for example, a likelihood of a rear-end collision with another vehicle going in front.

However, such car communication is dominated by the so-called ad-hoc and local communication (e.g. standardized in 802.11p), wherein information is exchanged directly between vehicles by using local broadcasts, multi-hoc communication and geo-routing mechanisms. Unfortunately, such systems may require installation of additional hardware on the vehicles and/or on the road infrastructure, such as additional antennas and detectors, and also additional user interfaces for interacting with the driver. This racy, in turn, also require installation of additional display and/or control elements, which are generally undesirable in the case of vehicle interiors, since space is limited and drivers' distraction should not exceed some acceptable level.

Moreover, such systems may also suffer from a reduced reliability in that locally generated, transmitted, and received radio signals may be prone to shadowing effects caused by buildings or other vehicles, or may be subject to limited communication range and/or equipment rate of the employed modules. In this way, it may be rendered difficult or even impossible to provide involved surrounding vehicles with warning information because other vehicles and/or the given local environment prevents penetrating of the necessary detection and/or notification signals.

At the same time, however, there are broadly available the so-called cellular telecommunications networks, such as GSM, PCS, UMTS, CDMA, network, and the like. These cellular telecommunications networks, including their respective infrastructure as well as mobile consumer equipment, are ubiquitous in many places, so that they are principally suitable for implementing vehicle assistant services.

SUMMARY

The object of the present invention is to provide a vehicle assistant system based on a cellular telecommunications network, the system providing reliable and efficient warnings to drivers who are in the risk of running into any danger situations. In particular, it is an object of the present invention to provide a more reliable driver assistant system which is substantially immune to local radio shadowing effects and which does not require too much of additional hardware having to be installed on and in the vehicle, i.e. which allows for implementation by means of existing hardware on the vehicle, such as mobile phones.

This object is achieved by the subject-matter of the independent claims. Preferred embodiments are described in the dependent claims.

According to an embodiment of the invention, a network entity of a cellular telecommunications network is provided, having a processing unit that is configured to define a spatial zone in the cellular telecommunications network; to receive route indication information from at least one mobile terminal on a vehicle inside the spatial zone; to generate a trajectory for the vehicle based on the received route indication information; to calculate a danger situation probability for the vehicle based on the generated trajectory; and to send a notification message to the mobile terminal if the danger situation probability exceeds a predefined threshold probability.

Thus, a driver assistant system can be facilitated in the context of an already existing cellular telecommunications network which may already be present in the area or vicinity of traffic roads, and, moreover, which may already present in form of respective mobile terminals that are suitable to be carried on or installed in vehicles.

Moreover, since the driver assistant systems is based on the technology of a cellular telecommunications network, additional information can be transmitted and exchanged which could serve for further improving the quality of respective warning messages that are provided to the drivers. In other words, additional information on—for example—speed of the involved vehicles may allow for a more precise forecast of specific danger situation probabilities, which, in turn, may improve the accuracy, timing, and quality of the warnings that are provided to the drivers. Further, a sensible selection can be effected, in that only the specific drivers are notified for which a predicted danger situation probability exceeds a certain threshold probability. In this way, the properties of cellular telecommunications networks can be employed such that respective messages can be sent only to specific mobile terminals in order to avoid distraction of other drivers that are (currently) not involved.

Further, existing technology and hardware is employed in an optimum way, in that the driver assistant system is facilitated by a cellular telecommunications network, which may render obsolete in many cases the installation of separate dedicated network infrastructure. Further, also hardware on the vehicle can be re-used (such as eCall units, or tolling devices), in that their respective capability of—for example—detecting a position and/or a distance to surroundings, can be forwarded to the mobile terminal on board of the vehicle.

According to another embodiment of the invention, a method is provided of operating a network entity of a cellular telecommunications network comprising: defining a spatial zone in the cellular telecommunications network; receiving route indication information from at least one mobile terminal on a vehicle inside the spatial zone; generating a trajectory for the vehicle based on the received route indication information; calculating a danger situation probability for the vehicle based on the generated trajectory; and sending a notification message to the mobile terminal if the danger situation probability exceeds a predefined threshold probability.

According to another embodiment of the present invention, a mobile terminal for use in a cellular telecommunications network is provided which has a processing unit that is configured to determine whether the mobile terminal is inside a spatial zone defined in the cellular telecommunications network; to generate route indication information that indicates possible movement of a vehicle; to transmit the route indication information to a network entity of the cellular telecommunications network when inside the spatial zone; to receive a notification message from the network entity indicating a danger situation probability exceeding a predefined threshold probability; and to generate an output based on the received notification message.

According to another embodiment of the invention, a method is provided of operating a mobile terminal for use in a cellular telecommunications network, the method comprising: determining whether the mobile terminal is inside a spatial zone defined in the cellular telecommunications network; generating route indication information that indicates possible movement of a vehicle; transmitting the route indication information to a network entity of the cellular telecommunications network when inside the spatial zone; receiving a notification message from the network entity indicating a danger situation probability exceeding a predefined threshold probability; and generating an output based on the received notification message.

According to yet another embodiment of the invention, a method of operating a driver assistant system based on a cellular telecommunications network, comprises detecting a spatial zone in the cellular telecommunications network; receiving route indication information from a mobile terminal on a vehicle inside the spatial zone with a network entity of the cellular telecommunications network; generating a trajectory for the vehicle based on the received route indication information; calculating a danger situation probability for the vehicle based on the generated trajectory; and sending a notification message to the mobile terminal if the danger situation probability exceeds a predefined threshold probability.

According to still further embodiments of the present invention, a computer program loadable into a processing unit and a respective computer program product comprising the respective computer program code are provided for executing a method according to an embodiment of the present invention.

BRIEF DESCRIPTION OF THE DRAWINGS

Embodiments of the present invention, which are presented for better understanding the inventive concepts but which are not to be seen as limiting the invention, will now be described with reference to the Figures, in which.

DETAILED DESCRIPTION

Figure 1:
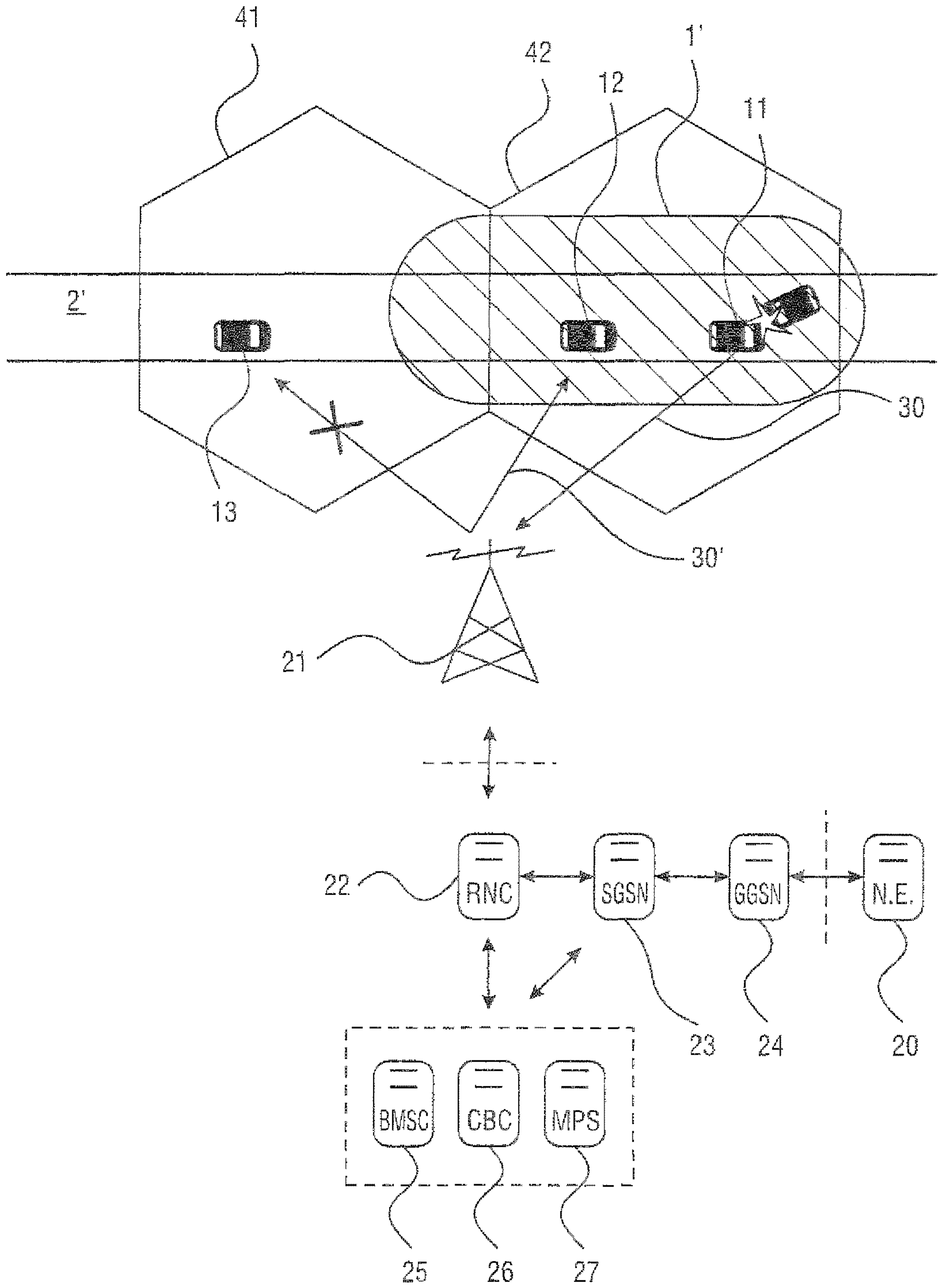
FIG. 1 shows a schematic representation of a local broadcast mechanism in a cellular telecommunications network.

In general, the mobile terminals may be any of mobile phones, hand-held mobile devices, Personal Digital Assistants (PDA), mobile positioning systems (such as hand-held GPS, Glonass, or Galileo devices), hand-held navigation systems, portable computers, and the like. They can be, however, also vehicle-mounted devices such as navigation systems, vehicle-mounted mobile phones, vehicle-mounted traffic alert systems, car stereo systems, and the like.

Further, the terminals may comprise modules and/or components according to and/or complying with the global system of mobile communications [GSM, General Packet Radio Service (GPRS), Enhanced Data Rates for GSM Evolution (EDGE), Universal Mobile Telecommunications System (UMTS), High Speed Packet Access (HSPA), 3GPP Long Term Evolution (LTE), Cell Broadcast Service (CBS), Multimedia Broadcast Multicast Service (MBMS), Location Based Services (LBS)]. Further, the terminals may comprise a GPS, Glonass, or Galileo module, various sensors to detect hazardous situations such as accidents, traffic jams or extreme whether conditions, display or speaker means for informing users about incoming warnings, and/or means for storing a digital map to determine spatial zones. In addition to the above, the mobile terminals may also be or be part of a vehicle integrated system, such as a so-called eCall (emergency call) device.

As understood by the present invention, the spatial zone can be any area that can be spatially defined, such as a geographically defined zone or zones that are defined by means of service quality levels, such as areas in which signals from a cellular communications network can be received with some predetermined threshold signal level.

The spatial zones may be defined, thus, by means of a set of geographical coordinates or rules as part of a map, or identification tags of cells (cell-IDs) or sub-cells of the respective cellular telecommunications network. The spatial zones can further be located around a hazardous area or point, for example road intersections and/or any other locations of concentrated and/or increased traffic. The spatial zone can also be defined and/or changed by an authority, such as a road traffic supervision authority. Such authorities may also distribute the spatial zones to digital map providers or to network and/or service providers for including the respective information to their Location Based Services (LBS).

Examples for areas in which or for which a respective spatial zone can be defined include road crossings, intersections and/or surroundings thereof, road junctions and/or surroundings thereof, up- or downhill sections of roads, winding sections of traffic roads, zones with an increased possibility of extreme localized weather conditions, such as road lowerings or road sections inside forests, in which, for example the probability of road glaze and/or fog can be substantially increased.

Further, according to the present invention, the route indication information can be any piece of information that indicates a route being taken or being intended to be taken by the vehicle. This route indication information can comprise anything from an entire route the vehicle is currently travelling along to only one specific driving behavior or driving direction at one crossing, intersection, or bifurcation.

In other words, the route indication information may be as little as only one piece of information that indicates a possible or intended behavior at some point of interest. For example, such route indication information may only include an intended direction at one, or the next, intersection. In this way, the route indication information, can be derived from the vehicle's direction indicator switches, the steering-wheel, or the navigation system that is handling a current route and indicates the driver along it. However, the route indication information can also comprise or be formed by a piece of information that indicates a specific driving behavior of the vehicle, such as a sudden stop. The latter may, for example, indicate a road block and/or a traffic jam, since vehicle speed is reduced substantially and/or abruptly.

Further, according to the present invention, a danger situation can be any situation and/or traffic configuration which could imply danger or damage to any vehicle, person, or any other "involved items". In particular, a danger situation may characterize the likelihood of an accident or a collision of one vehicle with another. Said "involved items" may include buildings, walls, road limitations such as beam barriers, traffic signs, traffic lights, and columns or pillars for holding such traffic signs or traffic illumination. Further, a danger situation can also specify a situation which not as such is characterized in leading to a possible accident, but also situations which may provoke an accident or a collision, such as a sudden breaking maneuver.

FIG. 1 shows a schematic representation of a local broadcast mechanism in a cellular telecommunications network. More specifically, a geographical area is covered by one or more cells 41, 42 of the cellular telecommunications network. This geographical area may comprise a road 2' on which several traffic members 11, 12, and 13, such as vehicles, travel in one or more directions. These vehicles 11 to 13 may all hold a mobile terminal, may these be hand-held or vehicle-mounted, of the respective cellular telecommunications network communicating with a base station 21 of this network.

Firstly, the concept of local broadcast within a cellular telecommunications network involves some sort of trigger event that initiates the generation and/or transmitting of a local broadcast message. In the overview example of FIG. 1 the trigger event is the transmitting of a network upload message 30 from one of the mobile terminals an a respective vehicle. In the shown case, the vehicle 11 is involved in a road accident and is automatically able to detect such an event and to emit a respective network upload message 30 to the base station 21.

The base station 21 of the cellular communications network, such as a node or a so-called eNodeB or NodeB, receives the network upload message 30 and forwards this message to a so called network entity 20 that is arranged for generating one or more broadcast messages 30' comprising information on the originating event, in this case the road accident in which vehicle 11 is involved. Further, the network entity 20 is arranged for sending said one or more messages 30' to at least one mobile terminal that has some kind of a spatial relationship with the mobile terminal on the vehicle 11, for example the mobile terminal on the vehicle 12. This facilitates a localized broadcast mechanism that allows for a spatial selection of recipient mobile devices.

FIG. 1 depicts a situation in which the spatial relationship is defined by means of a geographical subarea 1', or a spatial zone 1', being at least in part covered by the cellular telecommunications network. In this way, only the mobile terminal on the vehicle 12 receives the broadcast message 30', whereas, for example the mobile terminal on vehicle 13, that is outside the spatial zone 1' does not receive said reflection message 30'. In this way unnecessary distraction of drivers that are not involved is effectively avoided. In other words, the spatial zone 1' allows for a differentiation whether a mobile terminal on a specific vehicle should or should not receive the message 30' based on a spatial relationship.

In general terms, the configuration as shown in FIG. 1 may also involve a radio network controller 22, a serving GPRS support node 23, a gateway GPRS support node 24, a BM-SC 25, a cell broadcast center 26, and/or a mobile positioning system 27.

Figure 2A:
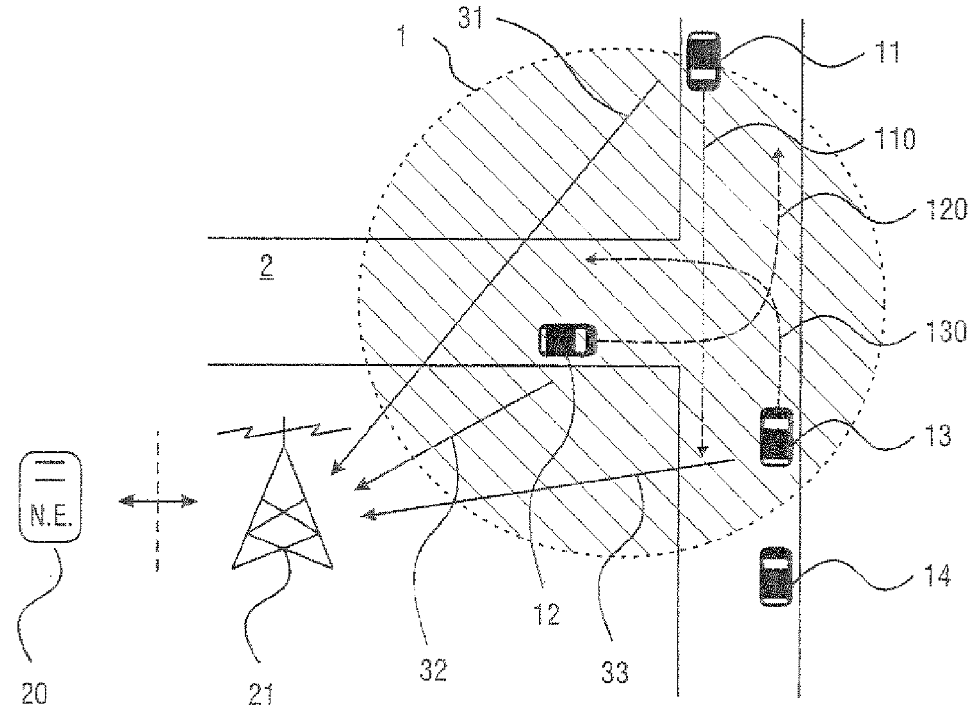
FIGS. 2A and 2B show schematic representations of road traffic scenarios according to embodiments of the present invention.

FIG. 2A shows a first possible scenario in which a cellular network based local broadcast system is employed according to an embodiment of the present invention. In this scenario, a plurality of vehicles 11 to 14 travel along a road 2 which forms, in the exemplary case of FIG. 2A, a T-junction. Further, a spatial zone 1 is defined such to cover a part of the road 2, namely at least the T-junction.

Upon entering the spatial zone 1, the vehicle 11 (or a mobile terminal on board thereof) detects entering the spatial zone 1 and registers with the network entity 20 by sending a respective message 31. This message 31 may already comprise route indication information that indicates a possible or an intended behavior of the vehicle 11 at the T-junction of the road 2. In the shown example, the vehicle 11 intends to remain straight on the road as indicated by the respective trajectory 110.

As shown; two more vehicles 12, 13 are also located within the spatial zone 1 and may already have registered with the network entity 20. However, independent from such registering, the vehicles 12, 13 may also transmit—by means of respective messages 32, 33—road indication information to the network entity 20. This transmission may be a repeated sending of the same route indication information (as possibly already transferred in conjunction with a prior registration), or may also be a route indication information update indicating that the intended route has changed while being inside the spatial zone 1.

The network entity 20 then calculates the trajectories of each vehicle, based on the provided route indication information (i.e. the first trajectory 110 of vehicle 11, a second trajectory 120 of the vehicle 12, and a third trajectory 130 of the vehicle 13). The shown vehicle 14 is still outside the spatial zone 1, and, as a consequence, neither sends any messages to the network entity 20 nor receives any warning messages therefrom. In this way, the driver of the vehicle 14 is not distracted by any notification which would only concern the involved vehicles 11 to 13.

According to another embodiment, the receiving mobile terminal on board of the vehicles may well also implement a message filter that assesses received messages according to the vehicle's context (location, time, driving direction, road, lane, latest potential trajectory). Therefore, not all received messages will be presented to the driver, but only the relevant ones according to the driving situation. This also reduces the distraction of the driver.

Figure 2B:
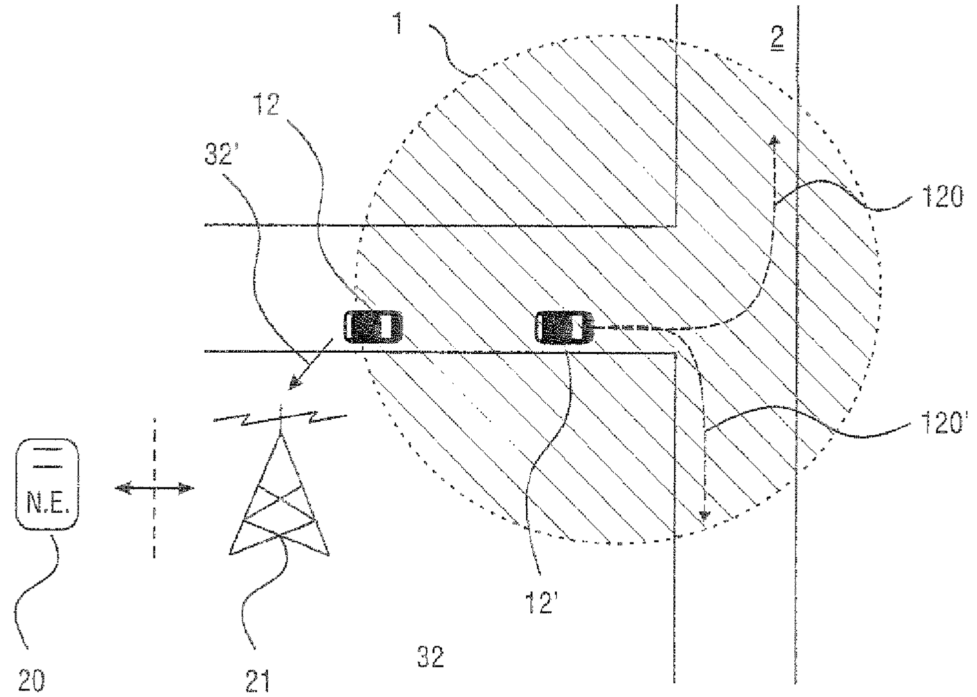

FIG. 2B shows another scenario according to an embodiment of the present invention. As shown, the vehicle 12 registers upon entering the spatial zone 1 with the network entity 20 via the base station 21. At this time, however, the vehicle 12 does not transmit any route indication information toward the network entity 20. However, due to the fact that the vehicle 12 has registered with the network entity 20, the network entity 20 is aware of the presence of the vehicle 12 inside the spatial zone 1.

At a later timely instance, therefore, the network entity 20 may assume the vehicle being advanced to a position 12'. Although no explicit route indication information has been provided so far by the vehicle 12, the network entity 20 may still be able to determine possible trajectories 120, 120' of the vehicle 12. The network entity 20 may for this purpose take into consideration the actual shape of the road 2. In other words, the network entity 20 may store an area of all possible trajectories within the spatial zone 1 for selecting possible trajectories even in case no specific route indication information is present or has been provided to the network entity 20.

Thus, the geometry and setup of the road 2 may define already a first set of possible trajectories, in that it is most likely that all vehicles travel along the respective road surface. However, the network entity 20 may also be aware of respective driving directions and/or turning lanes which would more closely specify the possible trajectories. In this way, however, the network entity 20 is able to determine from this plurality of possible trajectories the alternative trajectories 120, and 120' of the vehicle 12 within the spatial zone 1, and may, as a consequence, employ these "hypothetical" trajectories for further processing. In general, the alternative trajectories 120, 120' can be assigned with a trajectory probability p(trajectory) such that, in the depicted exemplary case, it satisfies p(120)=p(120')=½.

In general, additional trajectories from the area of possible vehicle trajectories and trajectory probabilities for each additional trajectory are generated if the received route indication information is ambiguous or no route indication information is received from the mobile terminal. In such cases, the network entity 20 may also send a route indication reminder message to the mobile terminal if no route indication information is received from the mobile terminal (e.g. the driver has forgotten to set the blinking light, and a respective reminder message could be "INTERSECTION AHEAD, PLEASE INDICATE INTENDED DRIVING DIRECTION", or simply "DIRECTION INDICATOR LIGHT?").

Figure 3A:
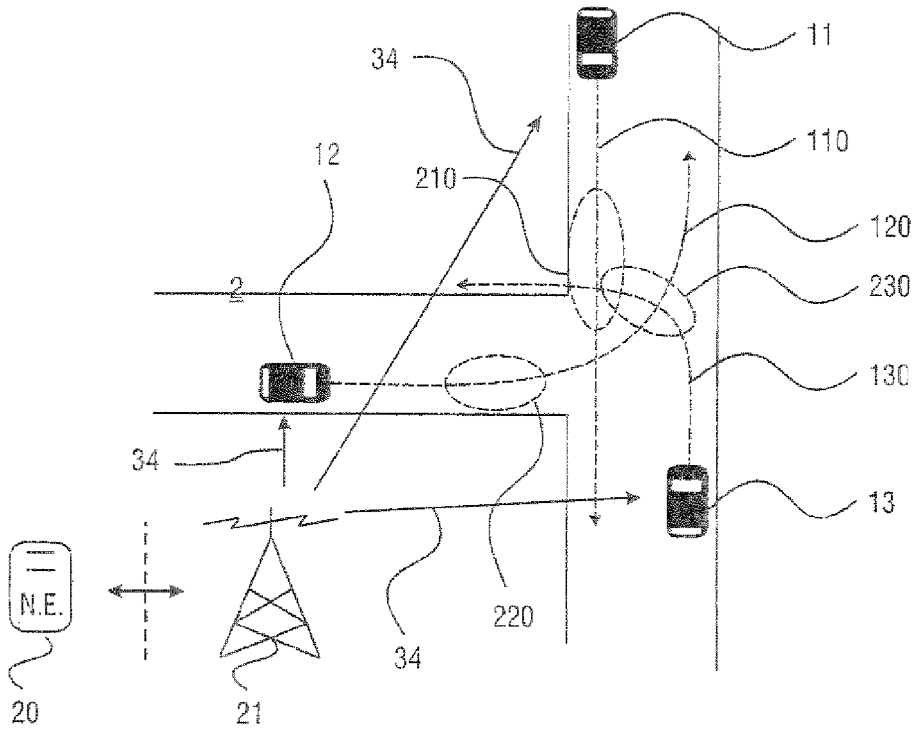
FIGS. 3A and 3B show schematic representations of further possible scenarios according to embodiments of the present invention.

FIG. 3A shows another scenario according to an embodiment of the present invention. For the sake of clarity, in FIG. 3A the depiction of the spatial zone 1 is omitted. However, all shown vehicles 11, 12, and 13 are assumed to be inside the spatial zone.

In order to be able to determine a danger situation probability, the network entity 20 considers all calculated trajectories 110, 120, and 130 of all present vehicles 11 to 13 in the spatial zone 1. Since the trajectories 110 to 130 not only comprise information on location of the respective vehicles, but also information on the respective time at which the respective vehicle is to be expected at a specific location, the network entity 20 is able to determine spatial areas 210, 220, and 230 for each vehicle. These areas 210 to 230 indicate an area in which the presence of the respective vehicle is likely at a given time.

The network entity 20 may also consider respective speed or other additional information as possibly provided in conjunction with the respective route indication information, such to adapt the spatial areas with respect to that additional information. By way of example, the network entity 20 may thus assume the zone 210 of vehicle 11 longer than, for example, the zone 220 of vehicle 12, since vehicle 11 has indicated a higher speed than vehicle 12. In general, this additional information may include any of the group of vehicle identification information, time information, location information, speed information, heading information, acceleration information, route information, vehicle type information, vehicle length information, vehicle width information, vehicle height information, vehicle mass information, driver experience information, and direction indicator information.

In any case, however, the network entity 20 may thus be enabled to determine whether these zones 220, 230 are likely to overlap at any time. As shown, the zones 210 and 230 overlap, which indicates that vehicles 11 and 13 are likely to collide. Since this is a possible situation in which a danger situation is assumed for vehicles 11 and 13, the network entity then decides to send a notification message to the mobile terminals on board of vehicles 11 and 13. In other words, it is the respective danger situation probability that triggers a local broadcast of notification messages by exceeding a predefined threshold probability.

Figure 3B:
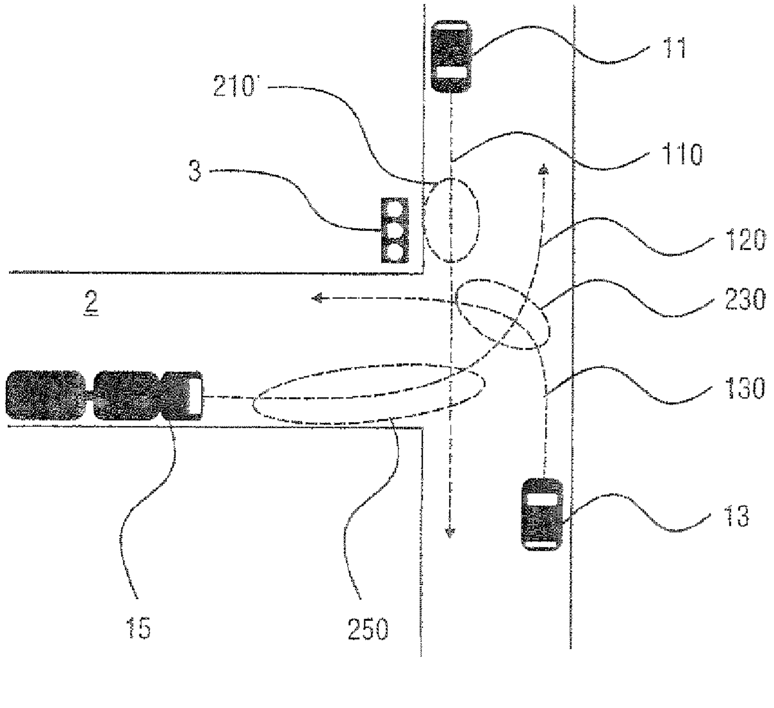

FIG. 3B shows another scenario according to an embodiment of the present invention. Accordingly, the network entity 20 is also aware of traffic signs 3 within the spatial zone. In this way, the network entity may take into account the effect of these traffic signs 3, such to determine a substantially different zone 210' of the vehicle 11. Since the network entity 20 may also be aware of the significance of the traffic sign 3 and, likely vehicle behavior in response thereto, a more accurate forecast and trajectory calculation is possible.

For example, the traffic sign 3 may switch to a red light prior to that vehicle 11 has passed the T junction. Hence, the network entity 20 may assume that the vehicle 11 is likely to reduce its speed and to come to a halt. As a consequence, the situation with respect to danger situation probabilities is substantially different with respect to the scenario as depicted in conjunction with FIG. 3A, and, as a further consequence, the network entity 20 may refrain from any sending of notification messages.

As further shown, the network entity 20 may also take into consideration vehicle-type or vehicle-size information such to determine accordingly a vehicle area 250 of the vehicle 15. In this way, the network entity 20 may further increase the prediction accuracy, since it can comprehensively predict and determine the possible trajectories such to reliably determine respective danger situation probabilities which can then, subsequently, compared to a predefined threshold probability, such to trigger the sending of a respective notification message.

Figure 4A:
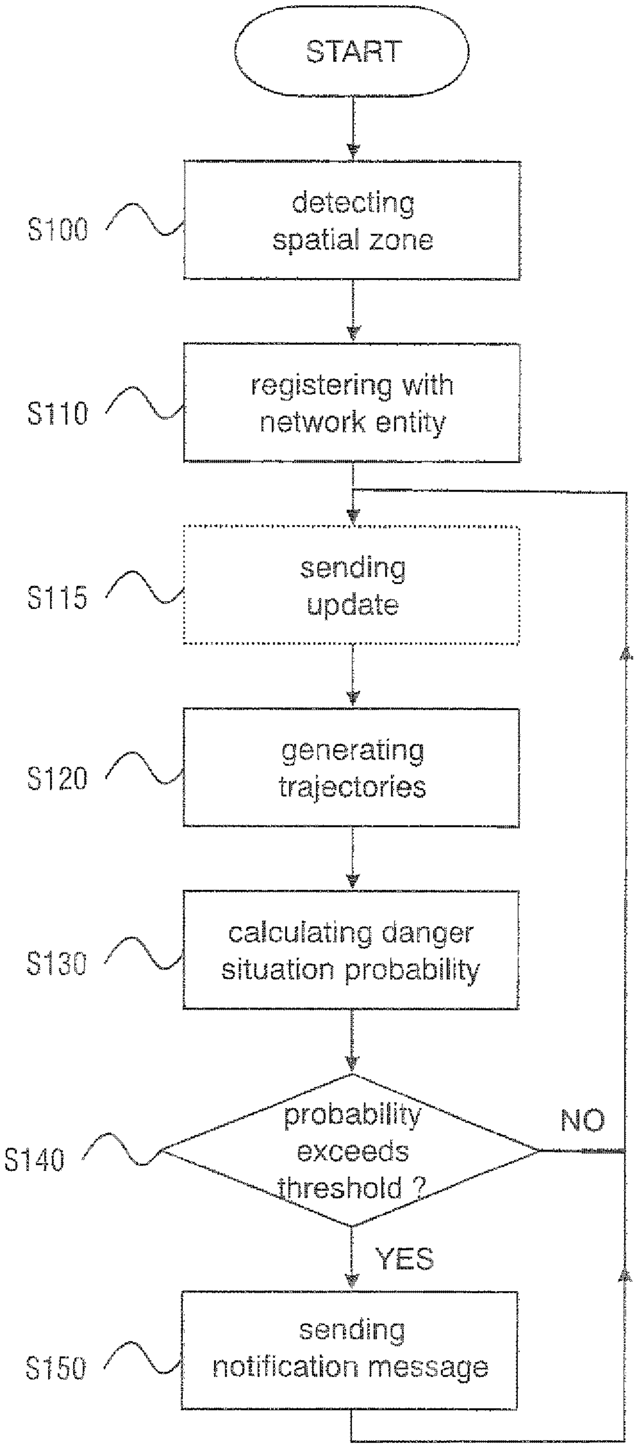
FIG. 4A shows a flowchart of a method of operating a cellular network based driver assistant system according to another embodiment of the present invention.

FIG. 4A shows a flowchart of a method of operating a cellular network based driver assistant system according to another embodiment of the present invention. According to this embodiment, a mobile terminal on board of a vehicle detects the entering of a spatial zone as depicted in step S100. In response to detecting the spatial zone, the mobile terminal may register with the network entity, so that the network entity becomes aware of the presence of the respective vehicle within the spatial zone (step S110). Said registering may also include transferring route indication information, if available, from the mobile terminal on board of the vehicle to the network entity.

The network entity may now generate possible trajectories (step S120) and calculate danger situation probabilities (step S130) based on the generated trajectories of all (registered) vehicles—or just a part thereof—inside the spatial zone. This calculation may be performed continuously such to account for new vehicles entering the spatial zone, and/or vehicles that have provided additional route indication information or route indication information updates (optional step S115).

In other words, a mobile terminal may also send an update in step 115 in order to change already transmitted route indication information. In this way, the method may account for the fact that the driver may change the driving indication, and, as a consequence, may operate a direction indicator accordingly, or may also deviate from a route being presented to the driver by an on board navigation system. In the latter case, the mobile terminal would have initially transferred route indication information based on this route being presented to the driver by the navigation system; however, since the driver deviates from that route, the mobile terminal may decide to send a respective update.

Based on all available danger situation probabilities, the network entity may decide in step S140 whether one of the danger situation probabilities exceeds a predetermined threshold probability. If it is determined that currently no calculated danger situation probability exceeds that threshold ("NO"), the method may continue in re-calculating the danger situation probabilities, re-assessing a possible exceeding thereof, and/or also considering newly received updates.

If, however, it is determined that at least one calculated danger situation probability exceeds the predetermined threshold probability ("YES"), the network entity sends a notification message to all or only to the involved vehicles (step S150). In this way, the network entity effectively warns the drivers on the respective vehicles of their calculated danger situation probability exceeding the threshold value. As a consequence, the drivers can be effectively warned of a danger situation, and, as a further consequence, may avoid any damage by acting accordingly.

Further, the sending of the notification message in step S150 may also comprise generating and sending of additional information, which could help the drivers to avoid or mitigate the danger situation. Such information may include, for example, indications toward a possible behavior which could avoid any accident or collision (e.g. braking or evasion instructions).

Figure 4B:
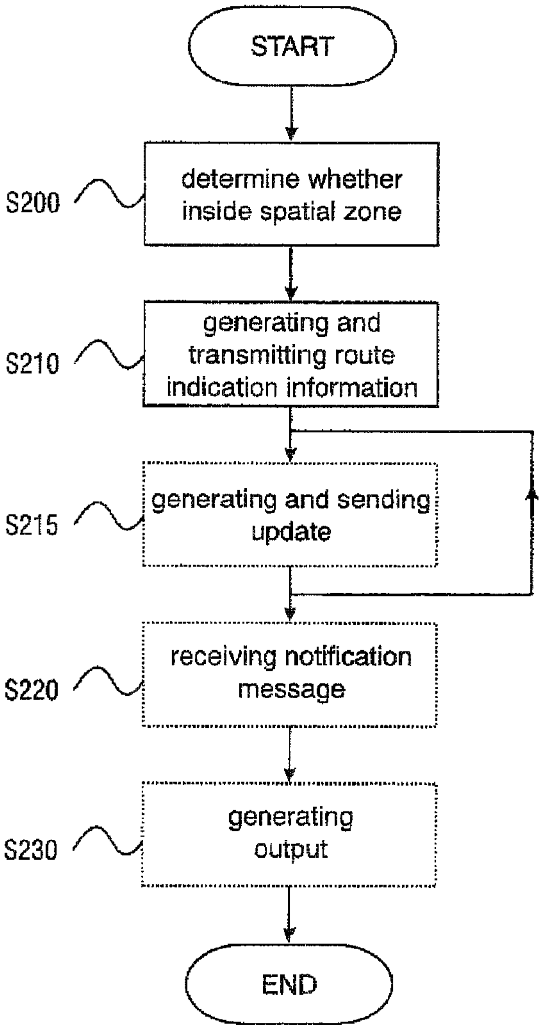
FIG. 4B shows a flowchart of a method of operating a mobile terminal according to another embodiment of the present invention.

FIG. 4B shows a flowchart of a method of operating a mobile terminal for use in a cellular telecommunications network according to another embodiment of the present invention. Accordingly, the mobile terminal has a processing unit that is configured to determine whether the mobile terminal is inside a spatial zone defined in the cellular telecommunications network (step S200). Such determining may then trigger the generating and transmitting of route indication information that indicates a possible movement of the vehicle (step S210). This generated route indication information is also transmitted in step S210 to a network entity of the cellular telecommunications network when inside the spatial zone. If the intended route changes, the mobile terminal may generate and send a respective update in step S215.

In case the network entity determines that a respective danger situation probability exceeds a predetermined threshold value, it will send a respective notification message to the mobile terminal, which is then received in step S220 by the mobile terminal. In response to this received notification message, the mobile terminal may also generate an output for optically and/or acoustically warning the driver of the vehicle based on the received notification message (step S230).

Figure 4C:
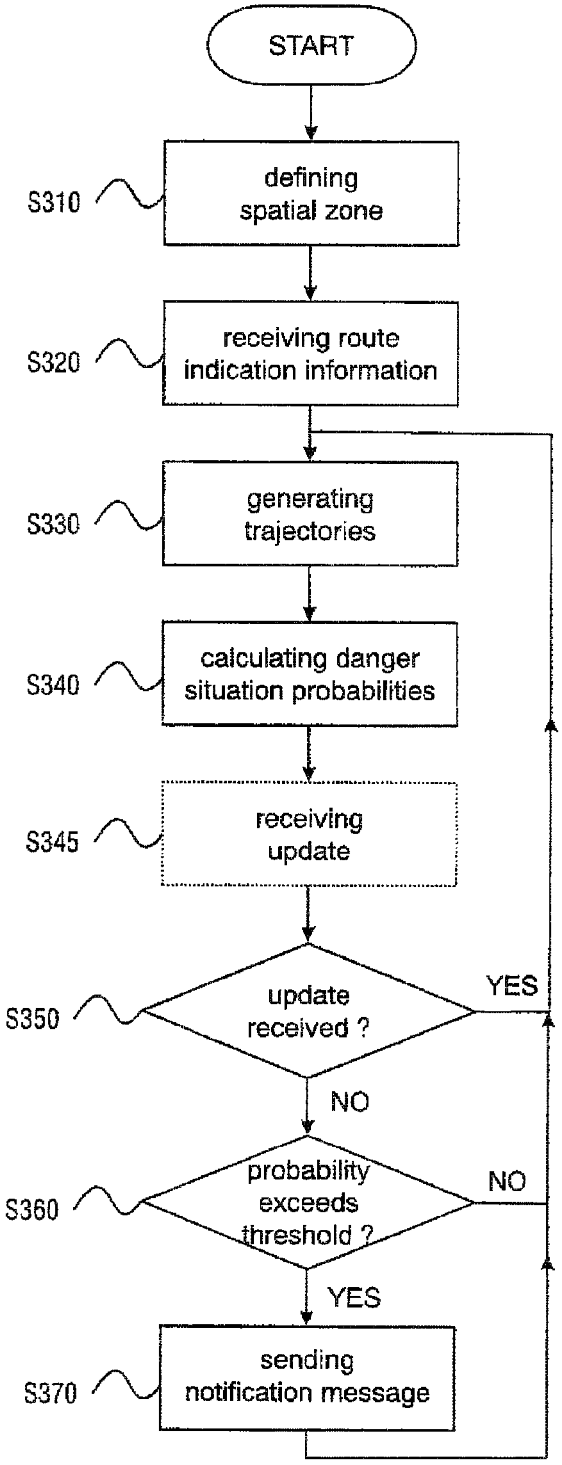
FIG. 4C shows a flowchart of a method of operating a network entity according to another embodiment of the present invention.

FIG. 4C shows a flowchart of a method of operating a network entity for use in a cellular telecommunications network according to another embodiment of the present invention. Accordingly, the method comprises defining the spatial zone in the cellular communications network (step S310), which may be effected by storing respective geographical information that defines the spatial zone.

When a vehicle enters or is inside this spatial zone, it may transmit route indication information, which is received by the network entity in step 3320. Based on this received route indication information, the network entity generates trajectories of each vehicle inside the spatial zone (step S330). Step S330 may also comprise generating a plurality of alternative trajectories for one vehicle if respective route indication information is ambiguous or no route indication information is provided by the vehicle. The generation of the alternative trajectories may also include calculating respective trajectory probabilities to account for the likelihood for the vehicle actually taking that trajectory.

In turn, based on these generated trajectories, the network entity can calculate danger situation probabilities in step S340 which can be subsequently compared to a predefined threshold probability in step S360.

If one of the calculated danger situation probabilities exceeds that predefined threshold probability ("YES" in step S360), the network entity sends notification messages to the involved mobile terminals (step S370), and, subsequently may continue calculating the danger situation probabilities and the respective supervision with respect to the predefined probability threshold thereof. Further, it may be provided that an update is received in step S345 which would trigger the generating of updated and/or new trajectories and probabilities in steps S330, S340 via option "YES" of the bifurcation S350. Still further, the updated or new trajectories can indicate the end of a danger situation and may, therefore, trigger a cancellation notification message to the vehicles if an alert is still raised. This may also help to reduce the distraction of the driver.

Figure 5A:
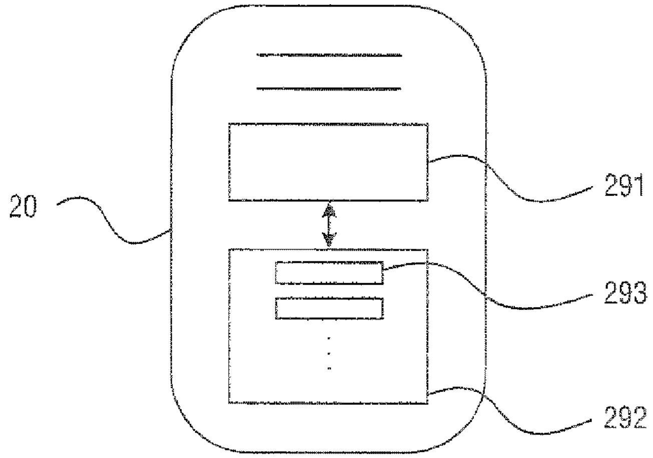
FIG. 5A shows a schematic representation of a network entity according to an embodiment of the present invention.

FIG. 5A shows a schematic representation of a network entity 20 according to another embodiment of the present invention. Accordingly, the network entity 20 comprises a processing unit 291 that is configured to perform any method embodiment of the present invention. For this purpose, the network entity 20 may comprise a memory unit 292, which, in turn, comprises memory sections 293 for holding respective code section for performing any steps of any method embodiment of the present invention.

Figure 5B:
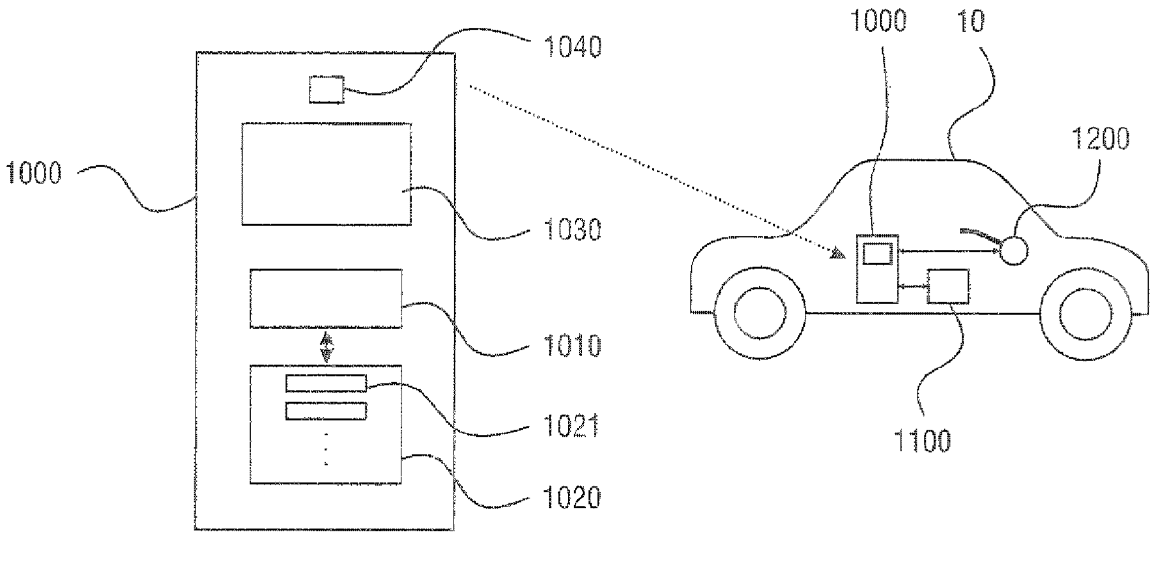
FIG. 5B shows a schematic representation of a mobile terminal on board of a vehicle according to another embodiment of the present invention.

FIG. 5B shows a schematic representation of a mobile terminal 1000 on board of a vehicle 10 that comprises a processing unit 1100, a memory unit 1020, which in turn, comprises memory sections 1021. The mobile terminal 1000 may also comprise visual or acoustic means 1030, 1040 for showing a received notification message or for generating additional output based on such received notification messages. The means 1030, 1040 may comprise displays, acoustic devices, such as loudspeakers or buzzers, or also flashing light indicators, for example, in the form of LEDs.

As also shown in FIG. 5B, the mobile terminal 1000 may be on board of a vehicle 10, and, there, being coupled to a navigational system 1100 and/or a direction indicator 1200. In this way, the mobile terminal 1000 may be aware of the intended route by the driver, and, hence, may generate and send respective route indication information.

Furthermore, the mobile terminal 1000 on board of a vehicle in FIG. 5B may comprise a filter unit (for example in form of respective code in another memory unit 1021) that selects the received notification messages for displaying them to the driver. Therefore, it can be implemented that not all received messages will be presented to the driver, but only the relevant ones according to, for example, the driving situation. This may again reduce the distraction of the driver.

According to further embodiments of the present invention, the driver assistant system comprises as a network entity an intersection controller that is responsible for one or more intersections. This could be in form of one intersection area only, or, in general, the intersection controller could well also perform the following steps for all intersection areas the controller is responsible for. The intersection controller could be further a stand-alone entity or part of another, already existing network entity, such as a data reflector.

The intersections area(s) is/are marked in digital map or indicated by a LBS flag in the cellular communication telecommunications system.

The vehicles then detect that they are entering an intersection area (spatial zone) by a) comparing their position information provided by a GPS device or by the communication network with positions of re-stored Intersection areas (e.g. provided by a digital map overlay), or by b) receiving a message from a LBS center that they are entering an intersection area.

The vehicles register themselves to the intersection controller when entering the intersection area by sending a message containing information elements, like vehicle ID, time t, location(t0), speed(t0), heading(t0), acceleration(t0), route information route(t0, t0+T) for the near future (until t0+T).

The vehicles that have successfully registered to the intersection controller update continuously their status information by sending messages containing information elements, like vehicle ID, time t, location(t1), speed(t1), heading(t1), acceleration(t1), route information route (t1, t1+T) for the near future (until t1+T), t1>to.

In parallel to the above, the intersection controller calculates for each update of the vehicles status information (containing the intended route information) one or more possible trajectories per vehicle. For example, the intersection controller calculates for vehicles 11, 12, 13 the trajectories 110, 120, 130. Due to the fact that 12 has indicated to turn left to the intersection controller the probability for taking 110 will be higher than the probability for taking another, although not indicated but nevertheless possible trajectory 120', resulting in a probability relation p(120)>p(120').

Calculation of collision probabilities from the trajectories of all vehicles within the intersection area. The trajectories 1×0 of all vehicles are a function of time and location. In case one trajectory is close on another trajectory at a specific or any time, the position and the time will be noted and an collision event will be released, i.e. the danger situation probability will exceed some predetermined threshold probability.

If a collision event is released, this will be communicated as fast as possible as warnings and driving instructions back to vehicles, e.g. as part of a notification message. The notification message may contain, amongst others, the collision position, time and information about the involved vehicles.

Although detailed embodiments have been described, these only serve to provide a better understanding of the invention defined by the dependent claims, and are not to be seen as limiting.

The invention claimed is:

1. A network entity of a cellular telecommunications network, the network entity comprising circuitry configured to:

define a spatial zone in the cellular telecommunications network;

receive first route indication information from a first mobile terminal that is on or within a first vehicle inside the spatial zone;

generate a first vehicle trajectory for the first vehicle based on the received route indication information;

store an area of possible vehicle trajectories inside the spatial zone;

if the received first route indication information is ambiguous:

generate additional first vehicle trajectories for the first vehicle within the stored area of possible vehicle trajectories; and generate trajectory probabilities for each additional first vehicle trajectory;

calculate a danger situation probability for the first vehicle based on the generated first vehicle trajectories; and send a notification message to the first mobile terminal if the calculated danger situation probability exceeds a predefined threshold probability.

2. The network entity of claim 1 wherein the circuitry is further configured to:

receive second route indication information from a second mobile terminal that is on or within a second vehicle inside the spatial zone;

generate a second vehicle trajectory for the second vehicle based on the received second route indication information;

calculate a danger situation probability for the first vehicle and the second vehicle based on the generated first and second vehicle trajectories; and send a notification message to the first mobile terminal and the second mobile terminal if the danger situation probability exceeds the predefined threshold probability.

3. The network entity of claim 1 wherein the circuitry is further configured to automatically operate at least a part of all mobile terminals inside the spatial zone in a connected mode of the cellular telecommunications network.

4. The network entity of claim 1 wherein the circuitry is further configured to receive a route indication information update.

5. The network entity of claim 4 wherein the circuitry is configured to:

generate an updated first vehicle trajectory for the first vehicle based on the route indication information update; and recalculate the danger situation probability based on at least one of the updated first vehicle trajectory and the additional first vehicle trajectories.

6. The network entity of claim 1 wherein the circuitry is further configured to register another mobile terminal that is on or within a vehicle in response to that vehicle entering the spatial zone.

7. The network entity of claim 6 wherein the circuitry is further configured to generate alternative vehicle trajectories for the vehicle associated with the another mobile terminal if either of:

no route indication information is received from the another mobile terminal; or ambiguous route indication information is received from the another mobile terminal.

8. The network entity of claim 7 wherein the circuitry is configured to send a route indication reminder message to the another mobile terminal if no route indication information is received from the another mobile terminal.

9. The network entity of claim 7, wherein the circuitry is configured to calculate a plurality of danger situation probabilities for the vehicles based on the generated alternative vehicle trajectories, and to send the notification message if at least one of the plurality of danger situation probabilities exceeds the predefined threshold probability.

10. The network entity of claim 1 wherein the route indication information comprises any of the group of:

vehicle identification information;
time information;
location information;
speed information;
heading information;
acceleration information;
route information;
vehicle type information;
vehicle length information;
vehicle width information;
vehicle height information;
vehicle mass information;
driver experience information; and
direction indicator information.

11. The network entity of claim 1:

wherein the network entity sends out a zone beacon signal; and wherein the first mobile terminal receives the zone beacon signal inside the spatial zone, and does not receive the zone beacon signal outside the spatial zone.

12. The network entity of claim 1 wherein the network entity defines the spatial zone based on a digital map.

13. The network entity of claim 1 wherein the circuitry is configured to calculate the danger situation probability continuously.

14. The network entity of claim 1, wherein the danger situation probability is indicative of a likelihood that the first vehicle may collide with a second vehicle in the spatial zone.

15. A method of operating a network entity of a cellular telecommunications network comprising:

defining a spatial zone in the cellular telecommunications network;

receiving first route indication information from a first mobile terminal that is on or within a first vehicle inside the spatial zone;

generating a first vehicle trajectory for the first vehicle based on the received route indication information;

storing an area of possible vehicle trajectories inside the spatial zone;

if the received route indication information is ambiguous:

generating additional first vehicle trajectories for the first vehicle from the stored area of possible vehicle trajectories; and generating trajectory probabilities for each additional first vehicle trajectory;

calculating a danger situation probability for the first vehicle based on the generated first vehicle trajectories; and sending a notification message to the first mobile terminal if the calculated danger situation probability exceeds a predefined threshold probability.

16. The method of claim 15, wherein the danger situation probability is indicative of a likelihood that the first vehicle may collide with a second vehicle in the spatial zone.

17. A method of operating a driver assistant system based on a cellular telecommunications network, the method being implemented by a network entity of the cellular telecommunications network, the method comprising:

detecting a spatial zone in the cellular telecommunications network;

receiving route indication information from a mobile terminal on or within a vehicle inside the spatial zone;

generating a trajectory for the vehicle based on the received route indication information;

storing an area of possible vehicle trajectories inside the spatial zone;

if the received route indication information is ambiguous:

generating additional vehicle trajectories for the vehicle from the area of possible vehicle trajectories; and generating trajectory probabilities for each additional vehicle trajectory;

calculating a danger situation probability for the vehicle based on the generated trajectories; and sending a notification message to the mobile terminal if the calculated danger situation probability exceeds a predefined threshold probability.

18. The method of claim 17, wherein the danger situation probability is indicative of a likelihood that the vehicle may collide with a second vehicle in the spatial zone.

19. A computer program product stored in a non-transitory computer-readable medium, the computer program product comprising program instructions for detecting vehicle danger situations in a cellular telecommunications network, the computer program product comprising computer program code which, when run on a network node, configures the network node to:

detect a spatial zone in the cellular telecommunications network;

receive route indication information from a mobile terminal on or within a vehicle inside the spatial zone;

generate a trajectory for the vehicle based on the received route indication information;

store an area of possible vehicle trajectories inside the spatial zone;

if the received route indication information is ambiguous:

generate additional vehicle trajectories for the vehicle from the area of possible vehicle trajectories; and generate trajectory probabilities for each additional vehicle trajectory;

calculate a danger situation probability for the vehicle based on the generated trajectories; and send a notification message to the mobile terminal if the calculated danger situation probability exceeds a predefined threshold probability.

20. The method of claim 19, wherein the danger situation probability is indicative of a likelihood that the vehicle may collide with a second vehicle in the spatial zone.

* * * * *

UNITED STATES PATENT AND TRADEMARK OFFICE

CERTIFICATE OF CORRECTION

PATENT NO. : 8,824,997 B2
APPLICATION NO. : 13/583416
DATED : September 2, 2014
INVENTOR(S) : Gehlen et al.

It is certified that error appears in the above-identified patent and that said Letters Patent is hereby corrected as shown below:

In the Specification

In Column 1, Line 51, delete “racy, in” and insert -- may, in --, therefor.

In Column 4, Line 44, delete “whether conditions,” and insert -- weather conditions, --, therefor.

In Column 5, Line 22, delete “information, can” and insert -- information can --, therefor.

In Column 5, Line 59, delete “terminals an” and insert -- terminals on --, therefor.

In Column 6, Line 43, delete “shown;” and insert -- shown, --, therefor.

In Column 8, Line 35, delete “and, likely” and insert -- and likely --, therefor.

In Column 10, Line 10, delete “step 3320.” and insert -- step S320. --, therefor.

In Column 10, Line 50, delete “1100,” and insert -- 1010, --, therefor.

In Column 11, Line 35, delete “t1>to.” and insert -- t1>t0. --, therefor.

In Column 11, Line 52, delete “an collision” and insert -- a collision --, therefor.

In the Claims

In Column 14, Line 56, in Claim 20, delete “method” and insert -- computer program product --, therefor.

Signed and Sealed this
Second Day of June, 2015

Michelle K. Lee
*Director of the United States Patent and Trademark Office*